(12) United States Patent
Urakabe et al.

(10) Patent No.: US 7,407,025 B2
(45) Date of Patent: Aug. 5, 2008

(54) POWER UNIT FOR AUTOMOBILE

(75) Inventors: Takahiro Urakabe, Tokyo (JP); Tatsuya Okuda, Tokyo (JP); Yoshikazu Tsunoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 361 days.

(21) Appl. No.: 10/538,653

(22) PCT Filed: Sep. 18, 2003

(86) PCT No.: PCT/JP03/11930

§ 371 (c)(1),
(2), (4) Date: Jun. 10, 2005

(87) PCT Pub. No.: WO2004/055963

PCT Pub. Date: Jul. 1, 2004

(65) Prior Publication Data

US 2006/0048983 A1  Mar. 9, 2006

(30) Foreign Application Priority Data

Dec. 16, 2002  (JP) .............................. 2002-363664

(51) Int. Cl.
*B60L 8/00* (2006.01)
(52) U.S. Cl. ..................... 180/65.1; 180/65.3
(58) Field of Classification Search ............... 180/65.1, 180/65.3, 65.4
See application file for complete search history.

(56) References Cited

U.S. PATENT DOCUMENTS

| | | | | |
|---|---|---|---|---|
| 6,002,221 A | * | 12/1999 | Ochiai et al. | 318/139 |
| 6,333,612 B1 | * | 12/2001 | Suzuki et al. | 318/432 |
| 6,507,506 B1 | * | 1/2003 | Pinas et al. | 363/79 |
| 6,923,279 B2 | * | 8/2005 | Shimane et al. | 180/65.1 |
| 6,938,713 B1 | * | 9/2005 | Tahara et al. | 180/65.3 |

FOREIGN PATENT DOCUMENTS

| | | |
|---|---|---|
| EP | 0 793 334 | 9/1997 |
| EP | 1 103 409 | 5/2001 |
| JP | 2001-008463 | 1/2001 |
| JP | 2002-171606 | 6/2002 |
| JP | 2002-218667 | 8/2002 |
| WO | 00/67366 | 11/2000 |

* cited by examiner

*Primary Examiner*—Christopher Ellis
*Assistant Examiner*—Brian Swenson
(74) *Attorney, Agent, or Firm*—Oblon, Spivak, McClelland, Maier & Neustadt, P.C.

(57) ABSTRACT

This invention provides a power unit for an automobile including a motor 6 for starting an engine by transmitting a power thereto and generating a power by receiving a power from the engine during rotation thereof, a power converting circuit 5 for transmitting a power to the motor 6, a battery 1, an energy storing source 20 for storing energy, and a DC/DC converter including at least two switching elements 10, 11, charging the energy storing source 20, and recovering energy in the energy storing source 20 to the battery 1. Since the switch provided in the DC/DC converter is normally turned on when the motor 6 generates power by receiving a power from the engine and charges the battery 1 through the power converting circuit 5 and the DC/DC converter, generation of heat from the DC/DC converter circuit part can be suppressed greatly.

20 Claims, 13 Drawing Sheets

POWER UNIT FOR AUTOMOBILE

TECHNICAL FIELD

The present invention relates to an automobile power unit, and more particularly to an automobile power unit that is mounted in a vehicle such as an automobile so as to be used as a battery.

BACKGROUND ART

In some of conventional automobile battery power circuits, a battery group and a capacitor group are connected in series, for example, as disclosed in JP 2002-218667 A (FIGS. 3 and 10).

In the aforementioned JP 2002-218667 A, the battery group is composed of a single battery with a rated voltage of 12 V, and the capacitor group is composed of a plurality of capacitors. A DC/DC converter is connected between both ends of the capacitor group and the battery group, and supplies the battery group with a power by lowering a voltage of the capacitor group. Here, the battery group is intended to supply a power to an electrical component with a rated voltage of 12 V, and loads are connected to both ends of the battery group.

In a conventional unit, a power conversion circuit starts operating at the time of a start (in starting an idling stop operation), and a bidirectional DC/DC converter is operated at the same time to transmit a power from the battery group to the capacitor group, whereby the amount of a current flowing through the capacitor group can be reduced. Therefore, the capacitance of the capacitor group can be reduced. After the power conversion circuit has been turned off, the bidirectional DC/DC converter recharges the capacitor group until its voltage reaches a predetermined voltage, thus preparing for a subsequent restart.

As shown in FIG. 10 of JP 2002-218667 A, a circuitry of the bidirectional DC/DC converter of the conventional power unit is provided with two MOSFETs that perform switching at a high frequency (50 to 200 kHz) in boosting and lowering a voltage. In the first MOSFET that performs switching in boosting a voltage, a drain terminal is connected to a high-voltage-side terminal of a capacitor, a source terminal is connected to one terminal of a choke coil, and a gate terminal is connected to a control circuit. In the second MOSFET that performs switching in lowering a voltage, a drain terminal is connected to the choke coil and the source terminal of the first MOSFET, a source terminal is connected to a low-voltage-side terminal of the battery group, and a gate terminal is connected to the control circuit. The other terminal of the choke coil is connected to a high-voltage-side terminal of a battery group and one electrode of a smoothing capacitor, and the other terminal of this capacitor is connected to a low-voltage-side terminal of the battery group.

The power unit supplies energy from the battery group and the capacitor group to the power conversion circuit in starting an idling stop operation, and the power conversion circuit operates. A motor thereby rotates, and an automobile starts moving. The motor causes a rise to an idling rotational speed, and an engine is ignited, so that a shift in driving source is made from the motor to the engine. At the time of a start, the motor operates for 0.2 to 1 second approximately. On the other hand, the motor also functions as a generator. Therefore, while the automobile is running, the power unit is in operation. This operation time is much longer than an operation time at the time of the start.

Because of a short operation time, the amount of heat generated at the time of the start is sufficiently smaller than the amount of heat generated during a power generation operation. The amount of instantaneous heat generation at the time of the start is very large, but can be sufficiently absorbed with a heat capacity of the unit. Accordingly, heat generation at the time of power generation is taken into account in thermally designing the power unit (designing the unit such that its temperature does not exceed an allowable temperature). In the conventional unit, the DC/DC converter is driven at a high frequency at the time of power generation so as to lower energy generated on the high voltage side (Vf3 in the drawing) to the level of a 12V battery. When high-frequency switching is performed, a switching loss increases and thus causes heat generation in a DC/DC converter portion. Because a power conversion circuit portion operates in a diode rectifying mode at the time of power generation, its frequency is low even when a switching operation is performed. The amount of heat generated by the power conversion circuit portion at this moment is small. Therefore, heat generation in the DC/DC converter portion must be sufficiently considered in thermally designing the unit. To keep the temperature of the unit at an allowable value, such measures as enlarging a radiation fin of the unit and mounting a forced air cooling fan or disposing a water cooling radiation fin on a lower face of the unit and turning it into a water cooling mechanism are required. Those measures bring about a rise in cost as well as an increase in size of the unit. Thus, the conventional power unit has a problem of being bulky and costly.

DISCLOSURE OF THE INVENTION

It is an object of this invention, which has been made as a solution to the above-mentioned problem, to obtain a compact, low-cost automobile power unit that substantially suppresses heat generation in a DC/DC converter circuit portion.

An automobile power unit according to the invention includes an engine and a motor that transmits a dynamic force to the engine and starts the engine, and that receives a dynamic force of the engine during rotation of the engine and generates a power. The automobile power unit further includes a power conversion circuit that has at least two DC voltage input/output terminals and transmits a power to the motor. The automobile power unit further includes a battery that is connected to the power conversion circuit and an energy storage source that is connected in series to the battery and stores energy. The automobile power unit further includes a DC/DC converter that is composed of at least two switching elements, that charges the energy storage source by boosting a voltage of the energy storage source, and that recovers energy in the energy storage source to the battery by lowering a voltage of the energy storage source. The switching elements of the DC/DC converter connect high-voltage-side ones of the DC voltage input/output terminals of the power conversion circuit to a high-voltage-side terminal of the battery. When the motor receives a dynamic force of the engine, generates a power, and charges the battery through the power conversion circuit and the DC/DC converter, the switches provided in the DC/DC converter are constantly turned on. Thus, a compact, low-cost automobile power unit that substantially suppresses heat generation in a DC/DC converter circuit portion can be obtained.

BEST MODES FOR CARRYING OUT THE INVENTION

EMBODIMENT 1

Figure 1:
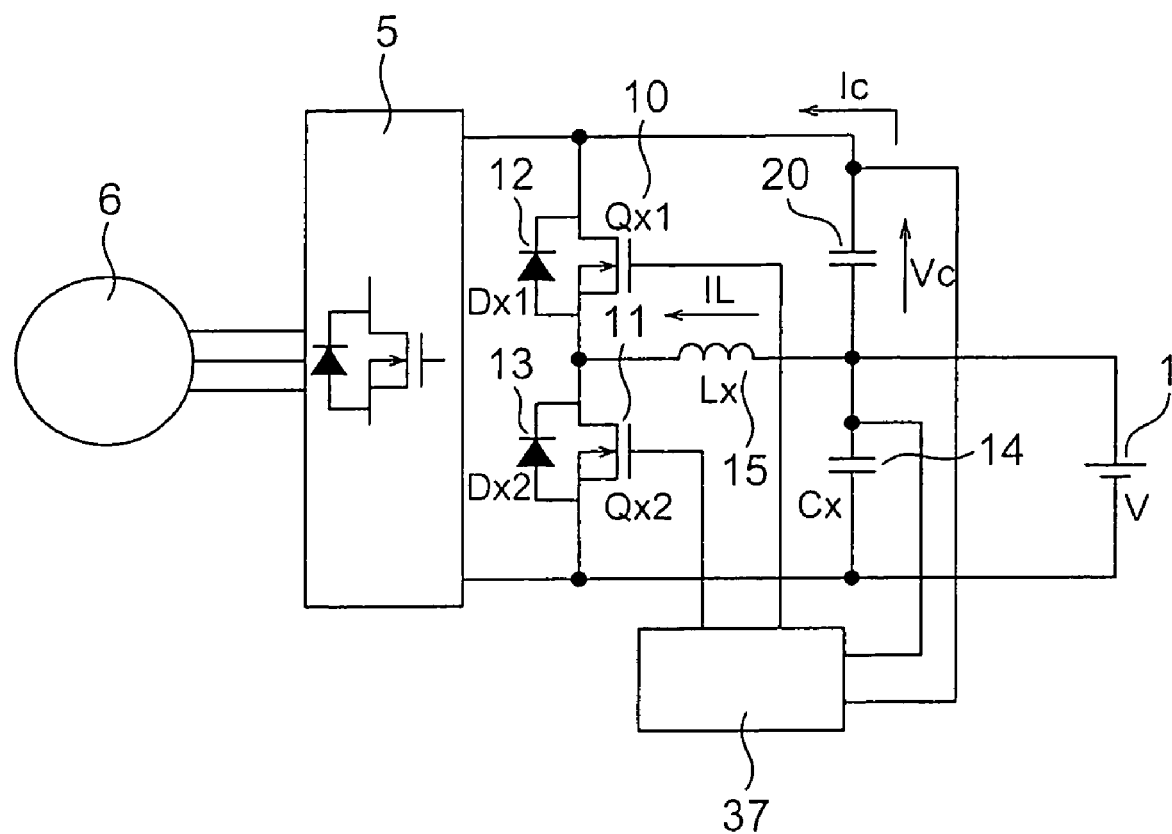
FIG. 1 is a block diagram showing a configuration of an automobile power conversion system according to Embodiment 1 of the present invention.

FIG. 1 shows a configuration of Embodiment 1 of the present invention. In FIG. 1, reference numeral 6 designates a motor which transmits a dynamic force to an engine (not shown) and starts it, and in turn receives a dynamic force of the engine during rotation thereof and generates an electric power. Reference numeral 1 is a battery which supplies a power for causing the motor 6 to rotate. Reference numeral 5 is a power conversion circuit which converts a voltage of the battery 1 into an alternating current or an interrupted direct current and outputs it to the motor 6. Reference numerals 10 and 11 are switching elements Qx1 and Qx2 (reference numerals 12 and 13), respectively. Reference numerals 12 and 13 are Diodes Dx1 and Dx2 connected in parallel to the switching elements 10 and 11 respectively. The switching elements 10 and 11 (Qx1, Qx2) are MOSFETs in which the diodes 12 and 13 (Dx1, Dx2) are disposed outside in parallel with parasitic diodes. The switching elements connect a high-voltage-side terminal (not shown) of a DC input/output terminal of the power conversion circuit 5 to a high-voltage-side terminal (not shown) of the battery 1. Further, in FIG. 1, a smoothing capacitor Cx, a choke coil Lx, and a capacitor as an energy storage source for storing energy are denoted by 14, 15, and 20 respectively. The choke coil 15 (Lx), the smoothing capacitor 14 (Cx), the switching elements 10 and 11 (Qx1, Qx2), and the diodes 12 and 13 (Dx1, Dx2) constitute a DC/DC converter. The DC/DC converter charges the capacitor by boosting a voltage thereof, and recovers energy stored in the capacitor to the battery 1 by lowering a voltage of the capacitor. To suppress a power loss at the time of a voltage-boosting or voltage-lowering operation of the DC/DC converter, the diodes 12 and 13 (Dx1, Dx2) with low forward voltages and good recovery characteristics are disposed. A control circuit for controlling operations of the switching elements 10 and 11 (Qx1, Qx2) is denoted by 37.

Figure 2:
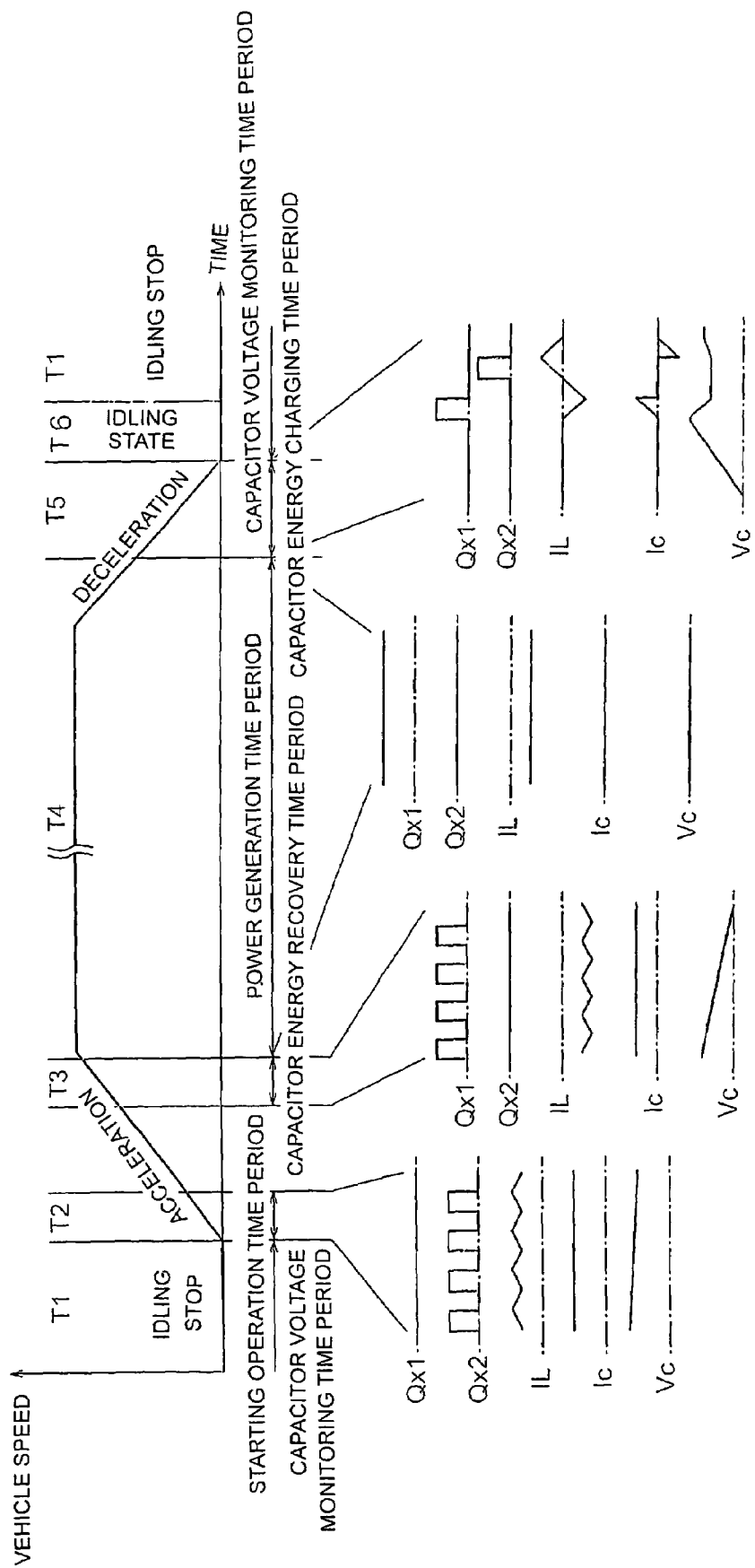
FIG. 2 is an operation waveform chart showing an operation of the automobile power conversion system according to Embodiment 1 of the present invention.

An operation will be described. FIG. 2 shows running states of a vehicle and operating waveforms of the DC/DC converter in those states. In the drawing showing the running states of the vehicle, the axis of abscissa represents a time, and the axis of ordinate represents a vehicle speed. Indicated as the running states of the vehicle are an idling stop state, starting, acceleration, steady running (power generation), deceleration, and idling stop. The operating waveforms at the time when the DC/DC converter is in operation are shown in a manner corresponding to operation periods. Indicated as the operating waveforms are gate voltages of the switching elements 10 and 11 (Qx1, Qx2) (ON at a high voltage), a current IL (whose positive direction is indicated by an arrow in FIG. 1) of the choke coil 15 (Lx), a current Ic (whose positive direction is indicated by an arrow in FIG. 1) of a capacitor group 20, and a voltage Vc (whose positive direction is indicated by an arrow in FIG. 1) of the capacitor 20.

First, the vehicle starts from an idling stop state (T1). In a starting operation period (T2), the capacitor 20 is charged until its charging voltage reaches a desired value. In this embodiment, the charging voltage of the capacitor is set to 7.5 V as a voltage required to raise a rotational speed of an engine of a 2 L-class vehicle to an idling rotational speed (approximately 800 rpm) (as will be described later). In other words, since the battery voltage is 12 V, the initial voltage inputted to the power conversion circuit 5 (three-phase alternating inverter) is 19.5 V. As soon as the starting operation is started, the switching element 11 (Qx2) performs switching (boosts the voltage of the DC/DC converter) at 50 kHz to 200 kHz with the switching element 10 (Qx1) being OFF. Energy is stored into the choke coil 15 (Lx) through a switch-ON operation. This energy is discharged to an input portion of the power conversion circuit 5 via the diode 12 (Dx1) through an OFF operation. Energy is supplied from the battery 1 to the power conversion circuit 5 through the DC/DC converter, and energy is supplied from the battery 1 to the power conversion circuit 5 through the capacitor 20. Because the DC/DC converter is operated in performing the starting operation so that energy is supplied via the DC/DC converter as well, the amount of energy stored in the capacitor 20 may be held small, and the capacitance of the capacitor 20 can be reduced (as will be described later). In the conventional power conversion system as well, this assisting operation of the DC/DC converter is described.

The engine rotational speed is raised to the idling rotational speed by means of the motor 6 and the engine is ignited, whereby the engine takes driving over. After the engine has taken driving over, the motor 6 is stopped. The operation of the engine accelerates the vehicle to a desired speed.

The meaning of idling stop will now be described briefly. Idling stop means an improvement in mileage and a reduction of the amount of harmful exhaust emissions. By stopping the engine while the vehicle is stopped, an improvement in mileage is achieved and the amount of harmful exhaust emissions is reduced. By raising the engine rotational speed to the idling rotational speed by means of the motor 6, the amount of harmful exhaust emissions can be substantially reduced. This is because many of the harmful exhaust emissions are produced when the vehicle is started by the engine.

The vehicle is accelerated and reaches a steady speed. When a remaining charge amount of the battery is detected as being deficient, the motor 6 operates as a generator. By taking a path reverse to that of the starting operation, the battery 1 is charged via the power conversion circuit 5. Immediately before the operation of charging the battery 1 is started, energy in the capacitor 20 is recovered to the battery 1 (time period T3). To recover the energy in the capacitor, an operation of lowering the voltage of the DC/DC converter is performed. The switching element 10 (Qx1) is switched, and the switching element 11 (Qx2) is OFF. When the switching element 10 (Qx1) is ON, energy in the capacitor is stored into the choke coil 15 (Lx). When the switching element 10 (Qx1) is OFF, the diode 13 (Dx2) becomes conductive and supplies the energy to the battery 1. If a transition to a power generation time period (T4) is made with no capacitor energy recovery time period (T3) provided, the switching element 10 (Qx1) consumes most of the energy in the capacitor when it is turned ON. Thus, although instantaneously, the switching element 10 (Qx1) generates heat. In the case of this embodiment, since the capacitor 20 is an electric double layer capacitor of 65 F to 100 F, the temperature of the switching element 10 (Qx1) constituted by the MOSFET may exceed an allowable value due to instantaneous heat generation, so that the switching element 10 (Qx1) may be destroyed. In this embodiment, however, since energy in the capacitor 20 is recovered to the battery 1 after the engine has been started and before a power generation operation is performed, the loss that is caused when the voltage of the capacitor 20 is made 0 V can be reduced, and power generation of the DC/DC converter portion can be suppressed.

In the power generation time period (T4), the switching element 10 (Qx1) of the DC/DC converter is constantly ON, and the switching element 11 (Qx2) is constantly OFF. The motor 6 is a claw pole motor with a field winding. By controlling a field winding current, the value of a DC voltage generated via the power conversion circuit 5 (three-phase diode rectifying circuit) can be controlled. The generated voltage assumes a voltage value for directly charging the battery 1. The battery 1 is charged via the switching element 10 (Qx1). In comparison with a case where the DC/DC converter is operated (switched) in a voltage-lowering manner at the time of power generation as in the case of the conventional power unit taking account of a two-power-source system, the loss in the DC/DC converter during the power generation time period can be reduced to ½ to ⅓, and the amount of heat generated by the DC/DC converter can be reduced to ½ to ⅓ as well. As a result, a cooling mechanism of the power conversion system including the power conversion circuit 5 and the DC/DC converter can be simplified, and a compact, low-cost unit that does not require a forced air cooling fan or a water cooling mechanism can be obtained.

In a deceleration time period (T5), the capacitor 20 is charged using braking energy. Deceleration or braking of the vehicle is detected using a speedometer, and part of the energy at the time of braking is utilized to charge the capacitor 20 such that its voltage reaches a predetermined voltage. Because the amount of energy used for charging is small, most of the energy at the time of deceleration is consumed as a mechanical loss (friction) in a brake.

If the energy at the time of deceleration is utilized to charge the capacitor 20, a good energy utilization efficiency is obtained, but slight complication of control is caused. Therefore, through a voltage-boosting operation of the DC/DC converter in the idling stop time period (T1) or a pre-stop idling time period (T6), the capacitor 20 may be charged until its voltage reaches a predetermined voltage.

Thus, in this embodiment, since the capacitor 20 is charged when the automotive vehicle is stopped or being decelerated, a desired motor output can be obtained in starting an idling stop operation.

Figure 3:
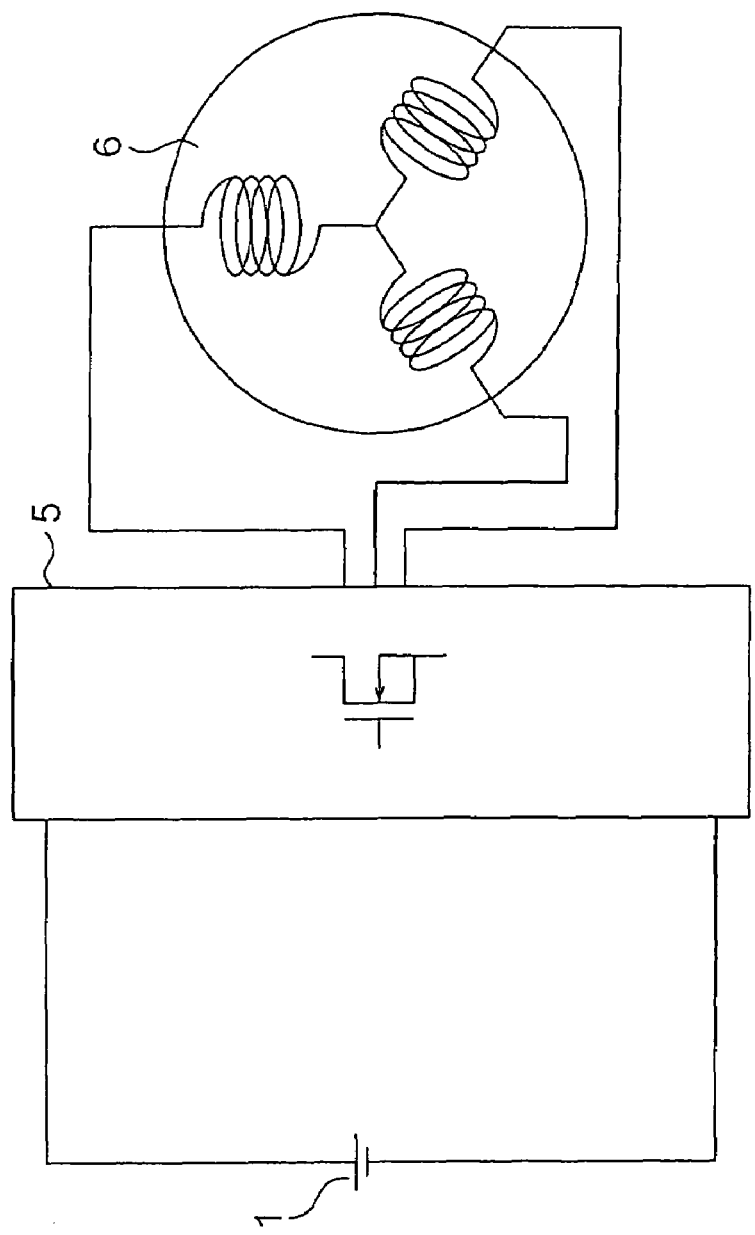
FIG. 3 is an explanatory view showing the configuration of the automobile power conversion system according to Embodiment 1 of the present invention.
Figure 4:
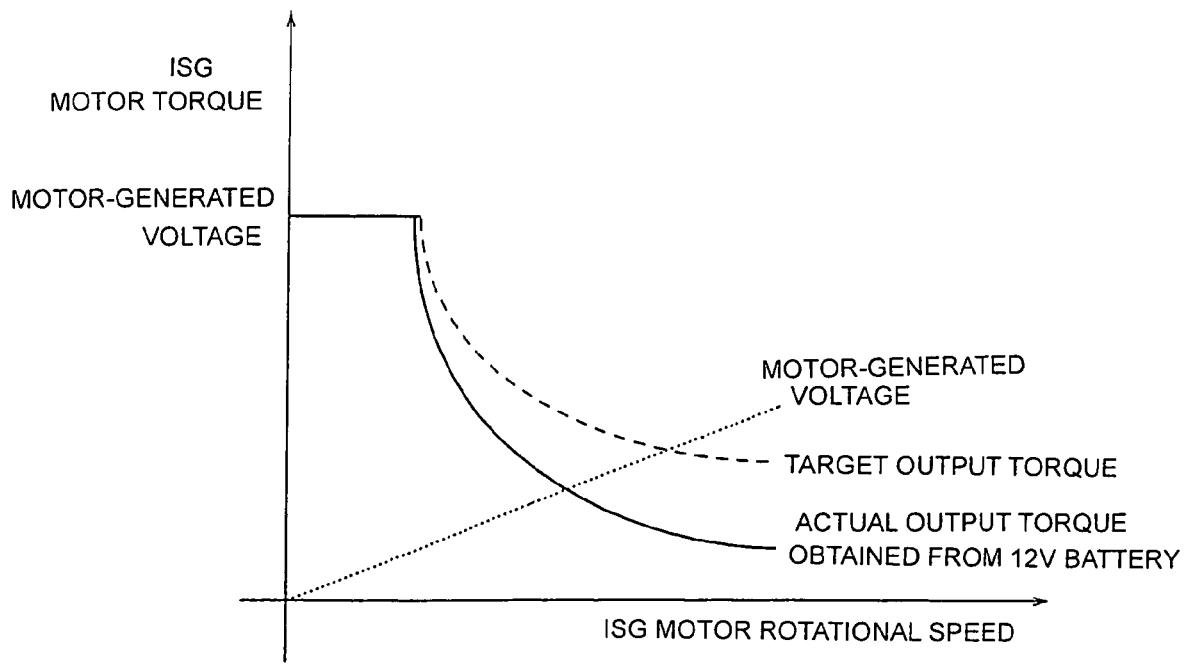
FIG. 4 is an explanatory diagram showing a relationship between a motor revolution speed and a motor-generated voltage in the automobile power conversion system according to Embodiment 1 of the present invention.

Next, an effectiveness of the present invention will be described. First of all, a configuration including the battery 1 of 12 V, the power conversion circuit 5 (three-phase inverter), and the motor 6 as shown in FIG. 3 will be considered. If the idling stop operation can be fulfilled in this configuration, a very compact, low-cost power conversion system can be realized. The function of a small vehicle in a 1.5 L or lower class can be fulfilled even by this configuration. However, a vehicle in a 2 L or higher class requires a larger torque output of the motor 6, and it is difficult to fulfill the function of the vehicle. In particular, when the rotational speed rises to a nearly value of the idling rotational speed, it is difficult to supply the motor 6 with energy using a battery voltage of 12 V, due to an electromotive voltage generated by the motor 6. If the motor 6 is designed for 12 V, a starting torque can be obtained, but a desired torque output cannot be obtained as the rotational speed rises (FIG. 4).

Figure 5:
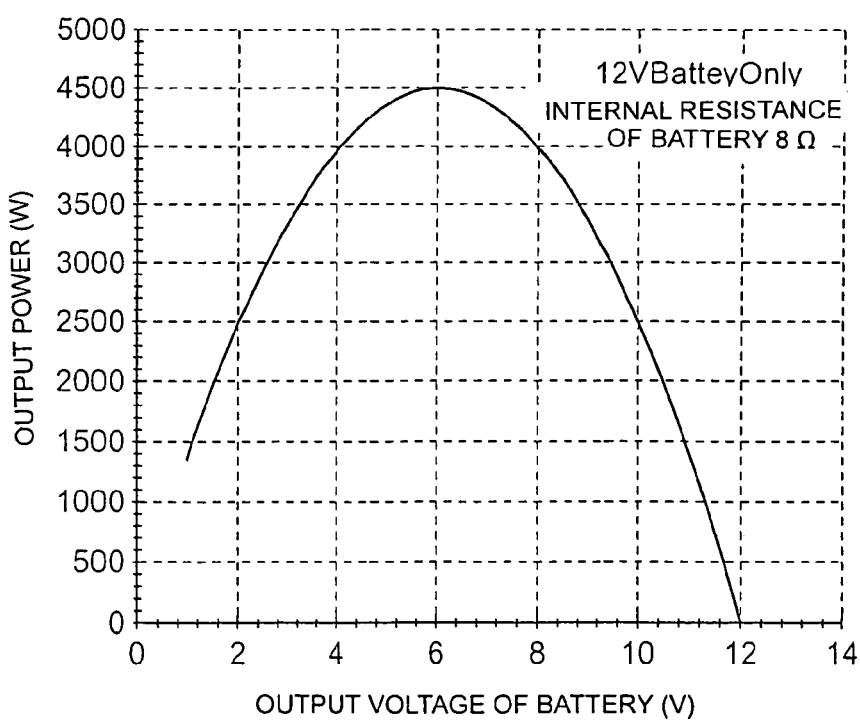
FIG. 5 is an explanatory diagram showing a relationship between a battery output voltage and a motor-generated voltage in the automobile power conversion system according to Embodiment 1 of the present invention.

To supply the motor with a large power when the motor rotational speed has risen, a high voltage is required in the input portion of the power conversion circuit. FIG. 5 shows a relationship between a maximum power obtainable from the battery 1 of 12 V and a battery output voltage at that moment. The battery 1 has an internal resistance of 8 mΩ. It is understood that the maximum power obtainable from the battery 1 decreases as the voltage of the battery 1 is raised.

Figure 6:
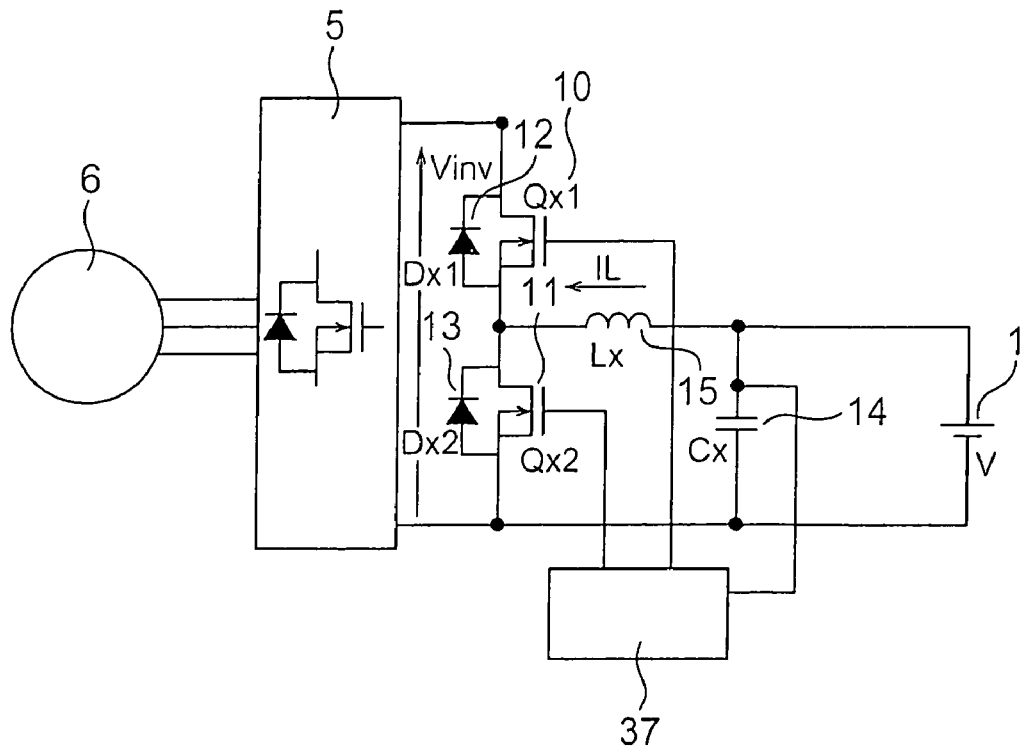
FIG. 6 is a block diagram showing a circuitry in the automobile power conversion system according to Embodiment 1 of the present invention.
Figure 7:
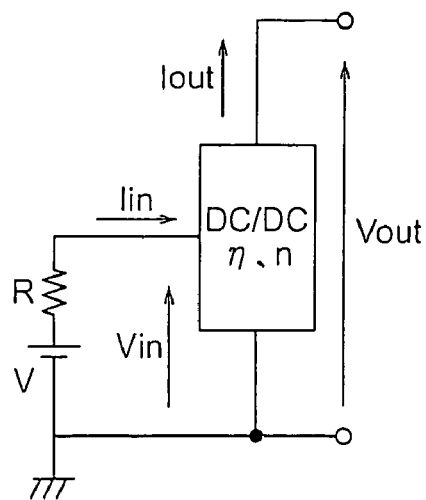
FIG. 7 is a block diagram showing a computation model in the automobile power conversion system according to Embodiment 1 of the present invention.
Figure 8:
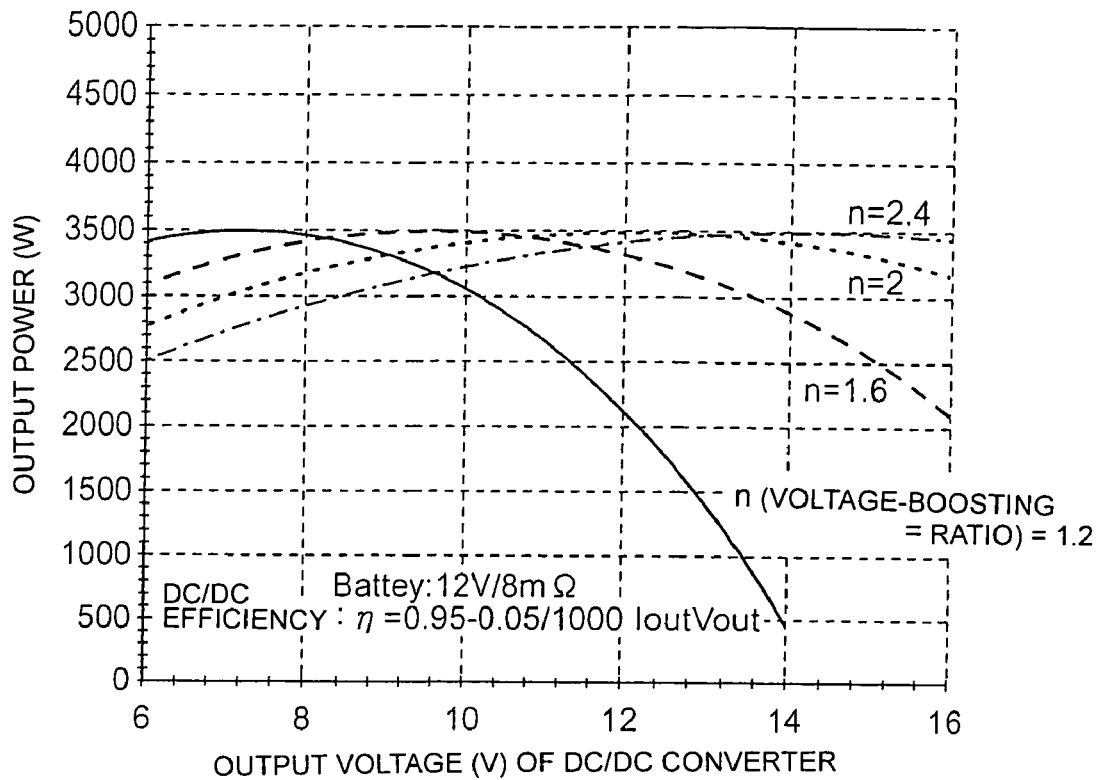
FIG. 8 is an explanatory diagram showing a relationship between a DC/DC converter output voltage and a maximum output voltage in the automobile power conversion system according to Embodiment 1 of the present invention.

Next, a consideration will be given to taking energy out from the battery of 12 V with an internal resistance of 8 mΩ through a boost in voltage by the DC/DC converter, and inputting the energy into the power conversion circuit. FIG. 6 shows a circuitry thereof. This circuitry is obtained by removing the capacitor 20 from the configuration of the present invention. A conversion efficiency η of the DC/DC converter is defined as in Equation (1), and Equations (2) to (4) are derived from a computation model shown in FIG. 7. By solving those equations, a relationship between a DC/DC converter output voltage and a maximum output power is obtained (FIG. 8).

$$\eta = 0.95 - \frac{0.05}{1000} Iout Vout \quad (1)$$

$$Vin = \frac{Vout}{n} \quad (2)$$

$$Iin = \frac{n}{\eta} Iout \quad (3)$$

$$V = RIin + Vin \quad (4)$$

It should be noted herein that n represents a voltage-boosting ratio of the DC/DC converter, Iout and Vout represent an output current and an output voltage of the DC/DC converter respectively, Vin and Iin represent an input voltage and an input current of the DC/DC converter respectively, R represents a battery internal resistance (8 mΩ), and V represents a battery voltage (12 V). It is apparent from FIG. 8 that an output power can be obtained at a high output voltage if the voltage-boosting ratio n is increased, but the efficiency-corresponding output of the DC/DC converter decreases. Of course, the configuration shown in FIG. 5 suffices unless an output of 3.5 kW or more is required. This configuration will be described in Embodiment 3, which will be described later.

Figure 9:
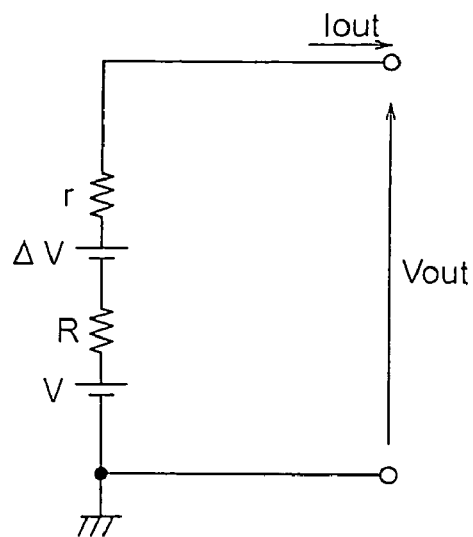
FIG. 9 is a block diagram showing another computation model in the automobile power conversion system according to Embodiment 1 of the present invention.
Figure 10:
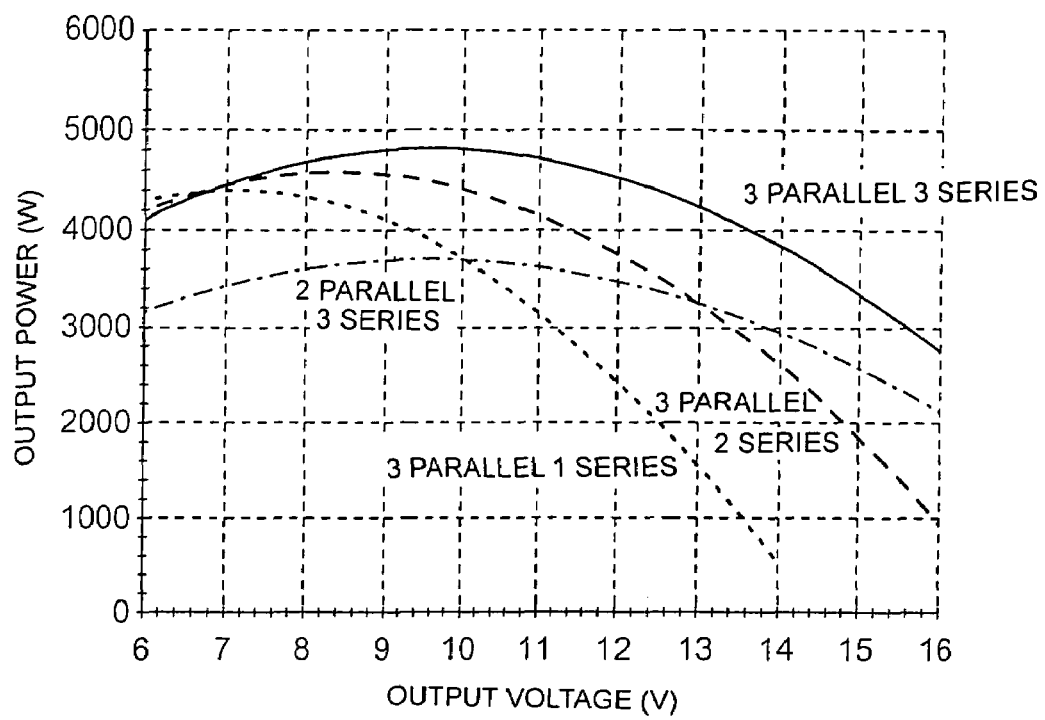
FIG. 10 is an explanatory diagram showing a relationship between an output voltage and an output power in the automobile power conversion system according to Embodiment 1 of the present invention.

If it is desired to throw a large power into the power conversion circuit at a high voltage, an energy source other than the battery is required. The present invention (FIG. 1) provides a configuration having two energy sources, thus making it possible to input a high power into the power conversion circuit 5 at a high voltage. The capacitor 20 serves as another energy source. As described above, the capacitor 20 is an electric double layer capacitor. The electric double layer capacitor is constructed such that one cell unit thereof has a voltage of 2.5 V. A required number of cells of the capacitor is calculated herein on the assumption that one cell of the capacitor 20 has a withstand voltage of 2.5 V, an internal resistance of 8 mΩ, and a capacitance of 100 F, and that an input voltage of 13 V and an input power of 4 kW (voltage and power values required in raising the rotational speed of the engine of the 2 L-class vehicle to the idling rotational speed solely by the motor 6) are inputted to the power conversion circuit 5. First of all, a case where the DC/DC converter performs no assisting operation will be discussed. FIG. 9 shows a computation model thereof. If capacitors are connected in series, the charging voltage increases correspondingly. Of course, if the capacitors are connected in parallel, the internal resistance decreases correspondingly. In this computation, since the capacitor 20 is regarded as a power source, the influence of a drop in voltage resulting from a decrease in energy in the capacitor is not taken into account. Although the capacitor 20 has a large capacitance, it causes a slight drop in voltage. Therefore, it is necessary to consider the number of parallel-connected cell groups and the like to some degree. FIG. 10 shows a result thereof. If the capacitor is composed of nine cells consisting of three parallel-connected cell groups each having three series-connected cells, an output of 4 kW can be obtained at 13 V even without an assist from the DC/DC converter. It is understood, however, that if the capacitor is composed of six cells consisting of two parallel-connected cell groups each having three series-connected cells, the output obtained at 13 V is 3.3 kW, which is insufficient.

Figure 11:
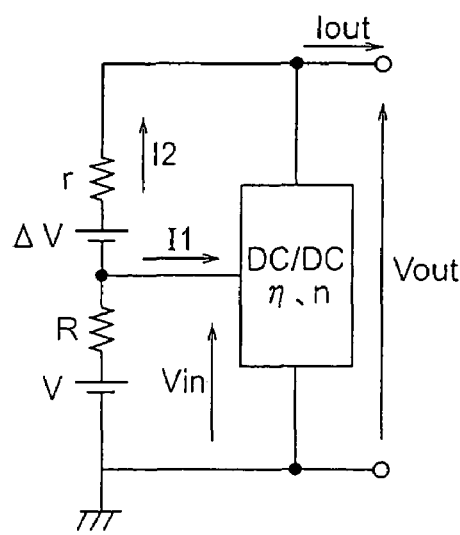
FIG. 11 is a block diagram showing another computation model in the automobile power conversion system according to Embodiment 1 of the present invention.

Next, a study will be made of a case where the capacitor 20 is composed of six cells consisting of two parallel-connected cell groups each having three series-connected cells and the DC/DC converter is operated in a voltage-boosting manner at the time of a start. FIG. 11 shows a computation model thereof. In this computation, the capacitor is regarded as a power source, and transient changes in voltage of the capacitor are neglected. An efficiency, which is denoted by η, is assumed to be 0.9, 0.85, and 0.8 when the DC/DC converter output power is 1 kW, 2 kW, and 3 kW, respectively. It should be noted that n represents a voltage-boosting ratio, ΔV represents a voltage of the capacitor, r represents an internal resistance of the capacitor, V represents a voltage of the battery, and R represents an internal resistance of the battery. Equations obtained from the computation model are shown below.

$$Vin = \frac{Vout}{n} \quad (5)$$

$$Idc = \frac{\eta}{n} I_1 \quad (6)$$

$$R(I_1 + I_2) + Vin = V \quad (7)$$

$$Iout = Idc + I_2 \quad (8)$$

$$Pdc = Idc Vout \quad (9)$$

$$R(I_1 + I_2) + rI_2 + Vout = V + \Delta V \quad (10)$$

Figure 12:
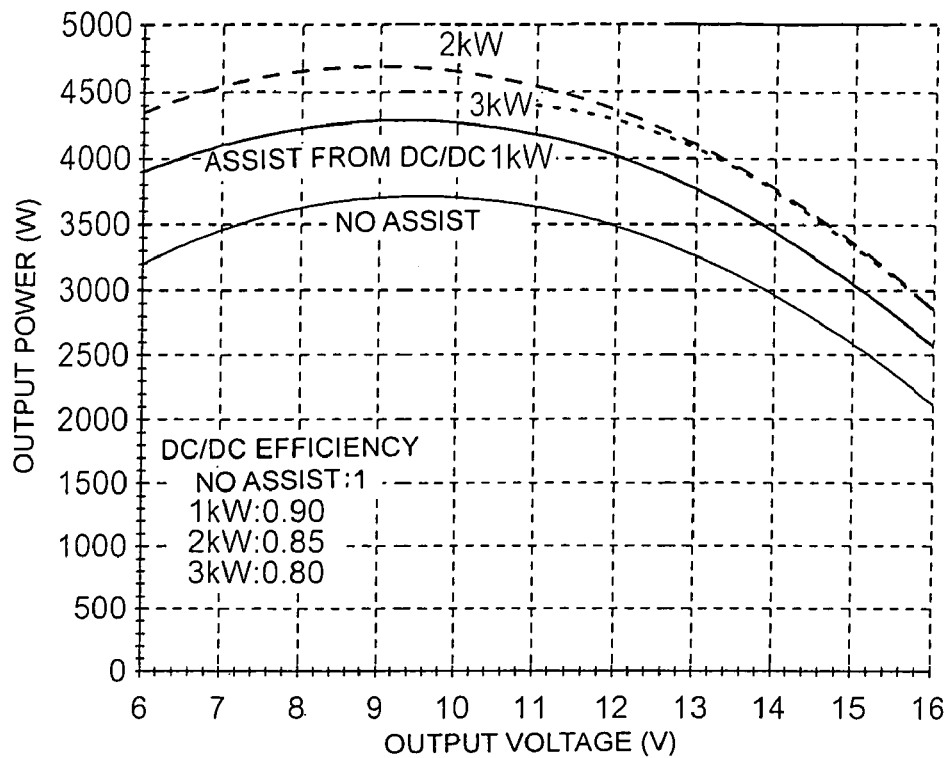
FIG. 12 is an explanatory diagram showing a relationship between an output voltage and an output power in the automobile power conversion system according to Embodiment 1 of the present invention.

By solving the above equations, a relationship between an output voltage and a maximum output power for each DC/DC converter assist power can be derived. FIG. 12 shows the relationship. It is apparent from this drawing that a desired power (4 kW or more) can be obtained through an assist of 2 kW from the DC/DC converter. It is understood that with an assist from the DC/DC converter, the size of the capacitor can be reduced to ⅔.

From the foregoing description, the operation of this embodiment is summarized as follows. The capacitor 20 is an electric double layer capacitor that is composed of six cells consisting of two parallel-connected cell groups each having three series-connected cells, and is charged at 7.5 V at the beginning of an idling stop starting operation. In starting, an assist of 2 kW is obtained from the DC/DC converter. By adopting this configuration and this operation, a desired idling stop operation for a 2 L-class vehicle can be fulfilled. Energy stored in the capacitor 20 prior to a power generation time period is recovered to the battery by operating the DC/DC converter, whereby the amount of heat generated by the DC/DC converter portion is kept small. In the power generation time period, the battery is charged by making the voltage generated by the motor coincident with the voltage for charging the battery and constantly turning on the switching element Qx1. Thus, the amount of heat generated by the DC/DC converter portion is kept small. The capacitor is recharged at the time of deceleration or idling stop, thus preparing for a subsequent start.

In this embodiment, as described above, at the time of a power generation operation, the voltage generated by the motor is set to the charging voltage of the battery group 1, and the switching element 10 (Qx1) constituted by a MOSFET is constantly turned on, thus making it possible to charge the battery group 1. Furthermore, energy in the capacitor 20 is recovered to the battery 1 by operating the DC/DC converter in a voltage-lowering manner after completion of a starting operation at the time of idling stop. Still further, the capacitor 20 is charged for an idling stop operation by detecting a decelerating state of the vehicle or a braking operation and utilizing braking energy. Further, the voltage of the capacitor is adjusted prior to the starting operation by operating the DC/DC converter in a voltage-boosting or voltage-lowering manner. By subjecting the power unit to the new control operations as described above, heat generation in a DC/DC converter circuit portion can be substantially suppressed during the power generation operation which is performed most of the time when the vehicle is in operation. Thus, it is possible to obtain a compact, low-cost automobile power unit.

Although MOSFETs are employed as the switching elements (Qx1, Qx2) in this embodiment, it goes without saying that they can be replaced with other semiconductor devices such as IGBTs. The switching elements (Qx1, Qx2) are constituted by semiconductor elements, so a switching operation can be performed at a high speed in this embodiment.

In this embodiment 1, the capacitor 20 may be replaced with another energy storage source such as an electrolytic capacitor.

EMBODIMENT 2

Figure 13:
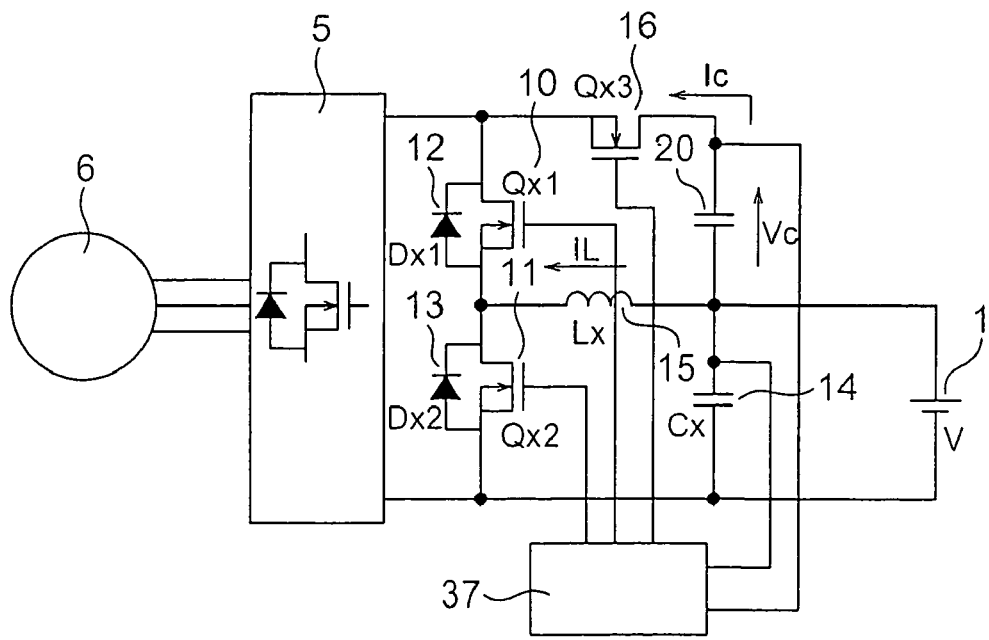
FIG. 13 is a block diagram showing a configuration of an automobile power conversion system according to Embodiment 2 of the present invention.

FIG. 13 shows a circuitry of Embodiment 2 of the present invention. Embodiment 2 is different from Embodiment 1 (FIG. 1) in that a switching element 16 (Qx3) is disposed between the high-voltage-side terminal of the capacitor 20 and a drain terminal of the switching element (Qx1) constituted by a MOSFET. The switching element 16 (Qx3) is a MOFET.

Figure 14:
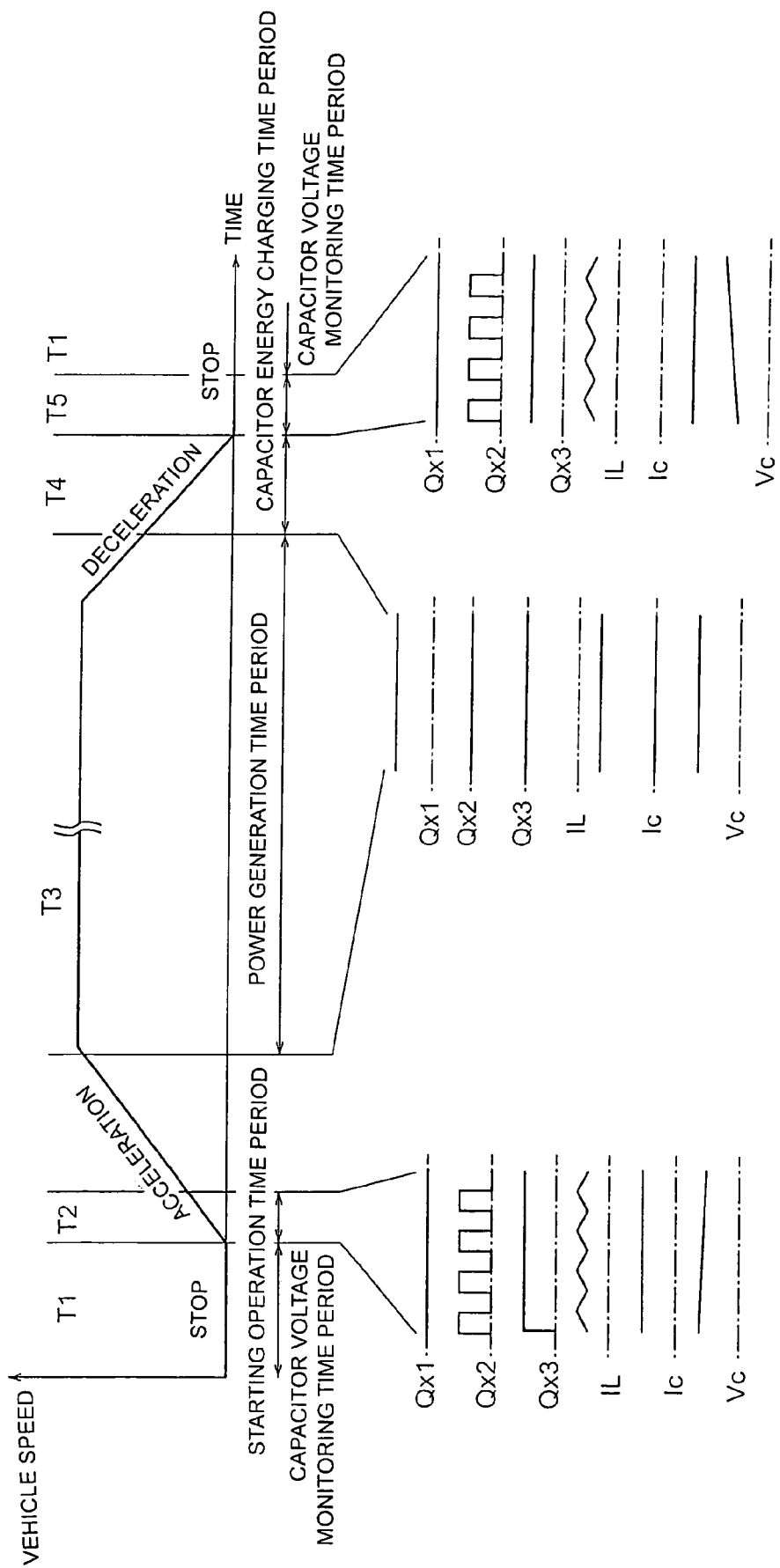
FIG. 14 is an operation waveform chart showing an operation of the automobile power conversion system according to Embodiment 2 of the present invention.

An operation will be described. FIG. 14 shows running states of the vehicle and operating waveforms of the DC/DC converter in those states. Indicated as the operating waveforms are gate voltages of the switching elements 10, 11, and 16 (Qx1, Qx2, Qx3) (turned on at a high voltage), a current IL (whose positive direction is indicated by an arrow in FIG. 13) of the choke coil, a current Ic (whose positive direction is indicated by an arrow in FIG. 13) of the capacitor 20, and a voltage Vc (whose positive direction is indicated by an arrow in FIG. 13) of the capacitor 20.

As shown in FIG. 14, in a starting time period (T2) of an idling stop operation, as in the case with Embodiment 1, energy is supplied to the power conversion circuit 5 through two paths, namely, from the battery 1 to the power conversion circuit 5 through the capacitor 20 and from the battery 1 to the power conversion circuit 5 through the DC/DC converter. Embodiment 2 is different from Embodiment 1 in that the switching element 16 (Qx3) is turned on at this moment. In FIG. 14, the switching element (Qx3) is turned on upon a start, but it is also appropriate to turn off the switching element 16 (Qx3) in a low rotational speed range of the motor 6, and to turn it on as soon as the rotational speed of the motor 6 rises. The voltage generated by the motor is low as shown in FIG. 4, so energy can be supplied in the low rotational speed range of the motor even when a low voltage is inputted to the power conversion circuit 5. Therefore, the switching element 16 (Qx3) can be turned off without problems. By thus retarding the operation of turning on the switching element 16 (Qx3), energy in the capacitor can be saved, and the size of the capacitor (the number of cells used) can be reduced. While the switching element 16 (Qx3) is turned off, the DC/DC converter may perform a voltage-boosting operation as shown in FIG. 14, and the switching element 10 (Qx1) may be constantly turned on. In a low rotational speed range where the voltage generated by the motor is low, a loss can be keep smaller by supplying energy with the switching element 10 (Qx1) being turned on rather than being turned it off.

In a power generation time period (T3), Embodiment 2 is identical to Embodiment 1 except in that the switching element 16 (Qx3) is turned off. There is no need to recover energy stored in the capacitor 20 to the battery 1 prior to the power generation time period. It can be concluded that Embodiment 2 is simple in terms of control because turning off the switching element (Qx3) is merely required upon termination of the starting operation time period.

When an idling stop state or a pre-stop idling state arises, the capacitor 20 is charged until its voltage reaches a desired voltage, thus preparing for a subsequent start. Thus, a desired motor output can be obtained in starting the idling stop operation.

In this embodiment, as described above, the switching element 16 (Qx3) is provided between the high-voltage-side terminal of the capacitor 20 and the drain terminal of the switching element 10 (Qx1) constituted by the MOSFET. During the power generation operation, the voltage generated by the motor is set to the charging voltage of the battery 1, the switching element 16 (Qx3) is turned off, and the switching element 10 (Qx1) constituted by the MOSFET is constantly turned on, whereby the charging of the battery 1 is made possible. Moreover, in an idling stop operation stopping time period, the capacitor 20 is charged until its voltage reaches a voltage required for a starting operation. By providing the power unit with the new switch as described above and performing new control operations, generation of heat from the DC/DC converter circuit portion can be substantially suppressed during the power generation operation which is performed most of the time when the vehicle is in operation. Thus, by being provided with the switching element 16 (Qx3), Embodiment 2 has greater merit as compared with Embodiment 1 in that the size of the capacitor can further be reduced, and the automobile power unit can be easily controlled on the whole. The amount of heat generated in the DC/DC converter portion of the power unit is kept small, which leads to a reduction of size and cost of the power unit.

In the case where energy is supplied from the battery 1 to the power conversion circuit 5 in the first half of the time period (T2) in which the engine is started by the motor 6 and energy is supplied from the battery 1 and the capacitor 20 to the power conversion circuit 5 in the second half of the time period (T2), the capacitance (size) of the energy storage source can be reduced while obtaining a desired motor output in starting the idling stop operation.

Although the MOSFETs are employed as the switching elements 10, 11, and 16 (Qx1, Qx2, Qx3) in this embodiment, it goes without saying that they can be replaced with other semiconductor devices such as IGBTs. By constructing the switching elements 10, 11, and 16 (Qx1, Qx2, Qx3) using semiconductor elements, a high-speed operation is enabled.

In Embodiment 2, the capacitor 20 maybe replaced with another energy storage source. For example, it may be an electrolytic capacitor. Owing to the switching element 16 (Qx3) which makes it possible to cut off the capacitor unless it is necessitated, the capacitor 20 can also be replaced with the battery 1, which is capable of storing a large amount of energy.

EMBODIMENT 3

FIG. 6 shows a configuration of Embodiment 3 of the present invention. The configuration of Embodiment 3 is different from that of Embodiment 1 shown in FIG. 1 in that the capacitor 20 is dispensed with. Accordingly, the battery 1 is the only energy source, thus it is difficult to obtain a high-output power. However, as described above (FIGS. 5 and 8), it is possible to obtain a large power at a high voltage. If a condition of an idling stop operation of the vehicle can be satisfied on conditions shown in FIG. 8, a reduction in size and cost of the power unit are made possible to an extent corresponding to elimination of the capacitor 20.

Figure 15:
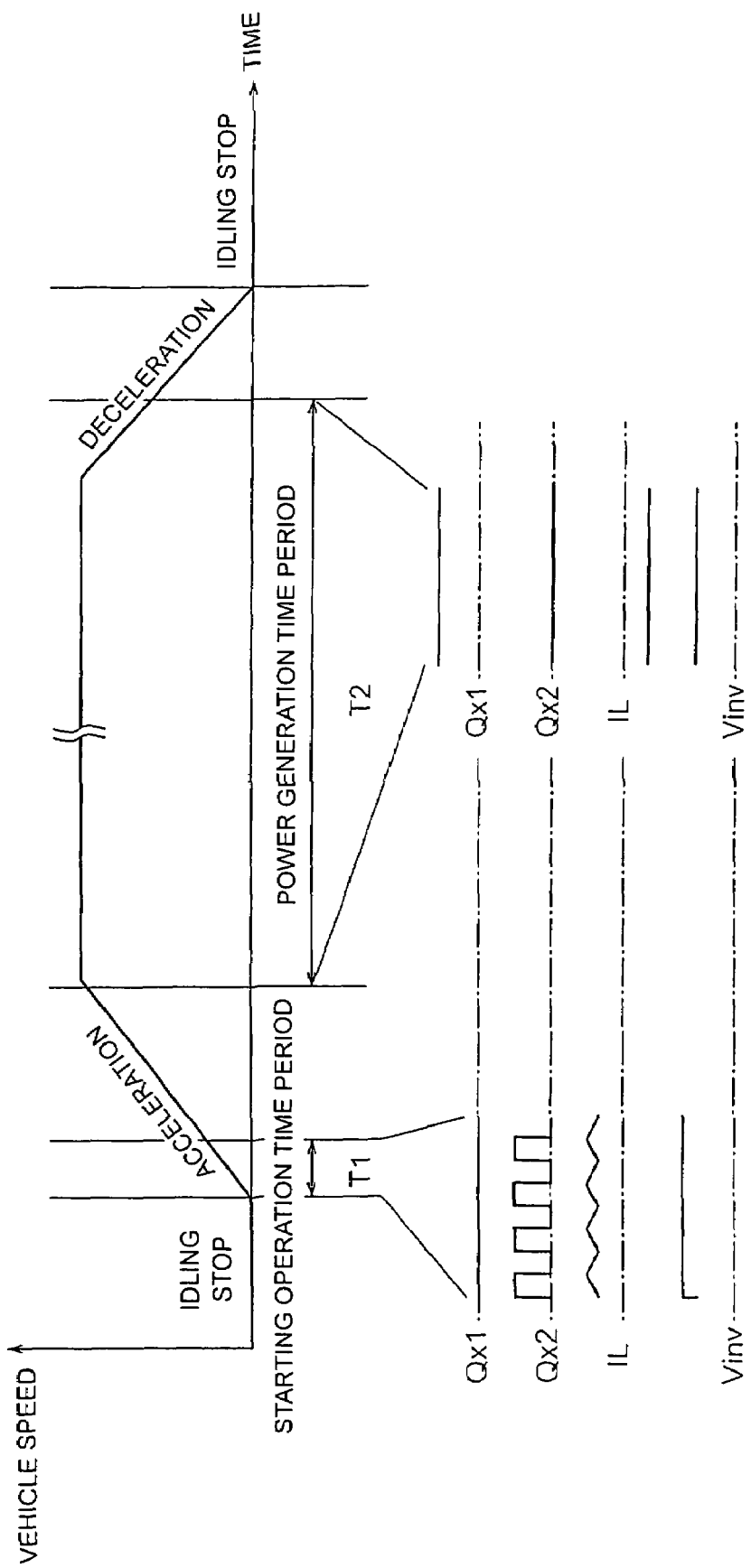
FIG. 15 is an operation waveform chart showing an operation of an automobile power conversion system according to Embodiment 3 of the present invention.

An operation will be described. FIG. 15 similarly shows running states of the vehicle and operating waveforms of the DC/DC converter in those states. Indicated as the operating waveforms are gate voltages of the switching elements 10 and 11 (Qx1, Qx2) (turned on at a high voltage), a current IL (whose positive direction is indicated by an arrow in FIG. 6) of the choke coil, and an input voltage Vinv (whose positive direction is indicated by an arrow in FIG. 6) of the power conversion circuit.

In starting (starting operation time period T1), the DC/DC converter is operated in a voltage-boosting manner, and a desired power is inputted to the power conversion circuit 5 at a desired voltage. In a power generation time period (T2), similarly, the switching element 10 (Qx1) is constantly turned on, the voltage generated by the motor 6 is made coincident with the charging voltage of the battery 1, and the battery 1 is charged.

According to this embodiment, as described above, the capacitor 20 is dispensed with, the voltage generated by the motor is set to the charging voltage of the battery 1 at the time of a power generation operation, and the switching element 10 (Qx1) constituted by the MOSFET is constantly turned on, whereby the charging of the battery 1 is made possible. By adopting the configuration as described above and performing the control operations as described above, a starting operation at the time of idling stop can be fulfilled and generation of heat from the DC/DC converter circuit portion at the time of power generation can be substantially suppressed in the case where a relatively small amount of power is enough to be injected into the power conversion circuit 5 at the time of a start. Thus, in this embodiment, in the power generation time period (T2), the switching element 10 (Qx1) is constantly turned on, the battery 1 is charged, and the amount of heat generated in the DC/DC converter portion of the power unit is kept small, whereby the power unit can be reduced in size and cost.

Although MOSFETs are employed as the switching elements 10 and 11 (Qx1, Qx2) in this embodiment, it goes without saying that they can be replaced with other semiconductor devices such as IGBTs. If the switching elements 10 and 11 (Qx1, Qx2) are constituted by semiconductor elements, a high-speed operation is enabled.

EMBODIMENT 4

In a power generation time period, the switching element 10 (Qx1) is constantly turned on, and the battery 1 is charged with a power generated by the motor 6 and rectified by the power conversion circuit 1. For example, if a power of 2 kW is generated, the current flowing through each switching element 10 (Qx1) is 2 kW/12 V=167 A. A large number of switching elements 10 (Qx1) constituted by MOSFETs are connected in parallel to cause a reduction in ON resistance, so that heat generation in the switching elements 10 (Qx1) is suppressed. Embodiment 4 of the present invention aims at further suppressing heat generation in this power generation time period.

Figure 16:
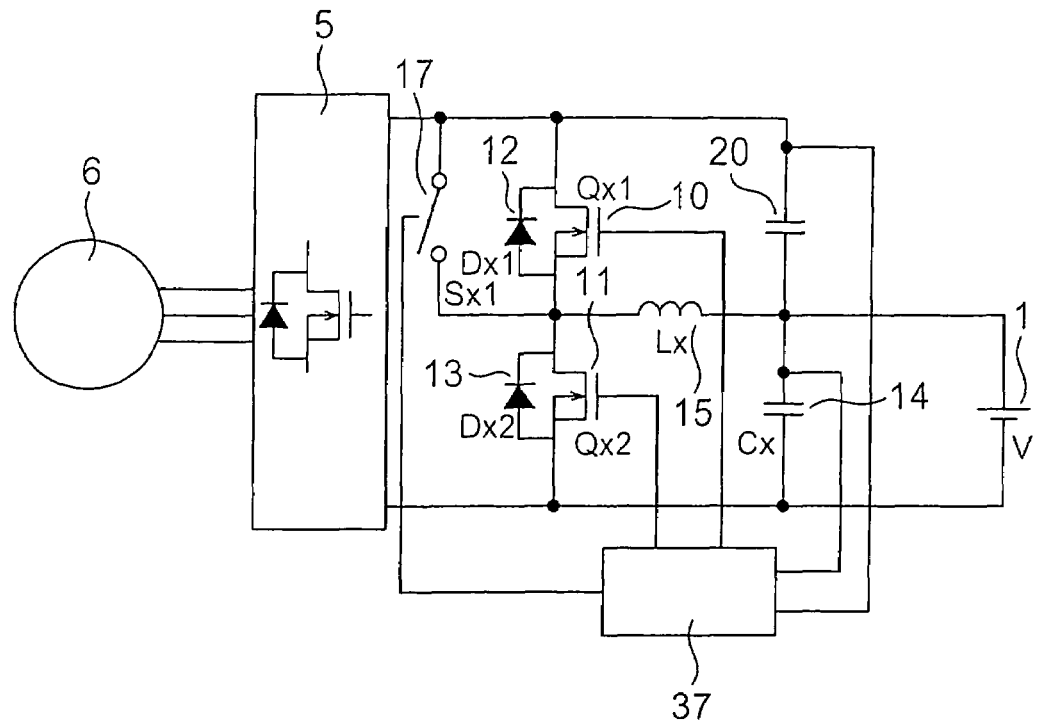
FIG. 16 is a block diagram showing a configuration of an automobile power conversion system according to Embodiment 4 of the present invention.

FIG. 16 shows a configuration of Embodiment 4 of the present invention. Embodiment 4 is different from Embodiment 1 (FIG. 1) in that a mechanical switch 17 (Sx1) is disposed in parallel with the switching element 10 (Qx1). In this case, there is no need to connect a large number of switching elements 10 (Qx1) in parallel, and a capacitance required at the time of a voltage-lowering operation in an capacitor energy recovery time period (T3) suffices. In the case of this embodiment, the switching element 10 (Qx1) is constituted by a single MOSFET. In a power generation time period, the battery 1 is charged with a generated power by turning on the switch 17 (Sx1).

In this embodiment, as described above, an effect similar to that of the aforementioned embodiment 1 is obtained. Also, the switching element 10 (Qx1) is constituted by a parallel circuit composed of a semiconductor element and a mechanical switch, so the mechanical switch 17 (Sx1) exhibits a very low resistance. Therefore, heat generation can further be suppressed.

EMBODIMENT 5

Figure 17:
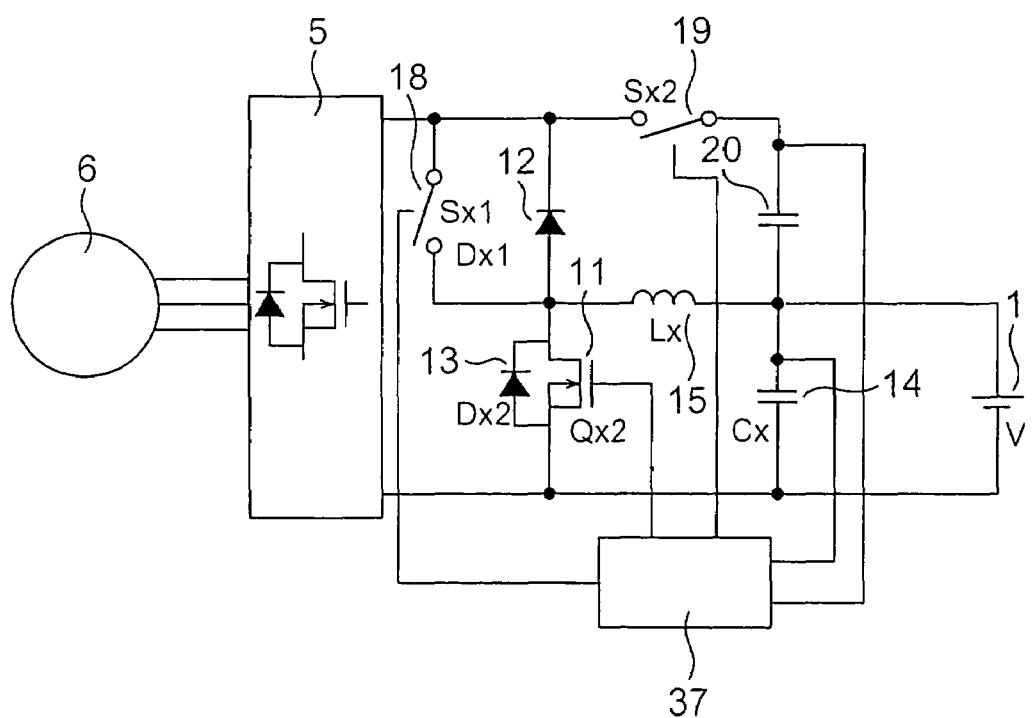
FIG. 17 is a block diagram showing a configuration of an automobile power conversion system according to Embodiment 5 of the present invention.

FIG. 17 shows a configuration of Embodiment 5 of the present invention. Embodiment 5 is different from Embodiment 2 shown in FIG. 13 in that mechanical switches 18 and 19 (Sx1, Sx2) are provided instead of the switching elements 10 and 16 shown in FIG. 13, respectively, which are constituted by the MOSFETs. There is no capacitor energy recovery time period in Embodiment 2, so the switching element 10 (Qx1) constituted by the MOSFET is not required. In a power generation time period, the battery 1 is charged with a power through the switch 18 (Sx1), which is a mechanical switch exhibiting a very low resistance as described above. Therefore, the amount of heat generation can further be reduced. In a starting time period, a current from the capacitor 20 is supplied to the power conversion circuit 5 through the switch 19 (Sx2). Thus, heat generation in the starting time period can be suppressed as well.

EMBODIMENT 6

Figure 18:
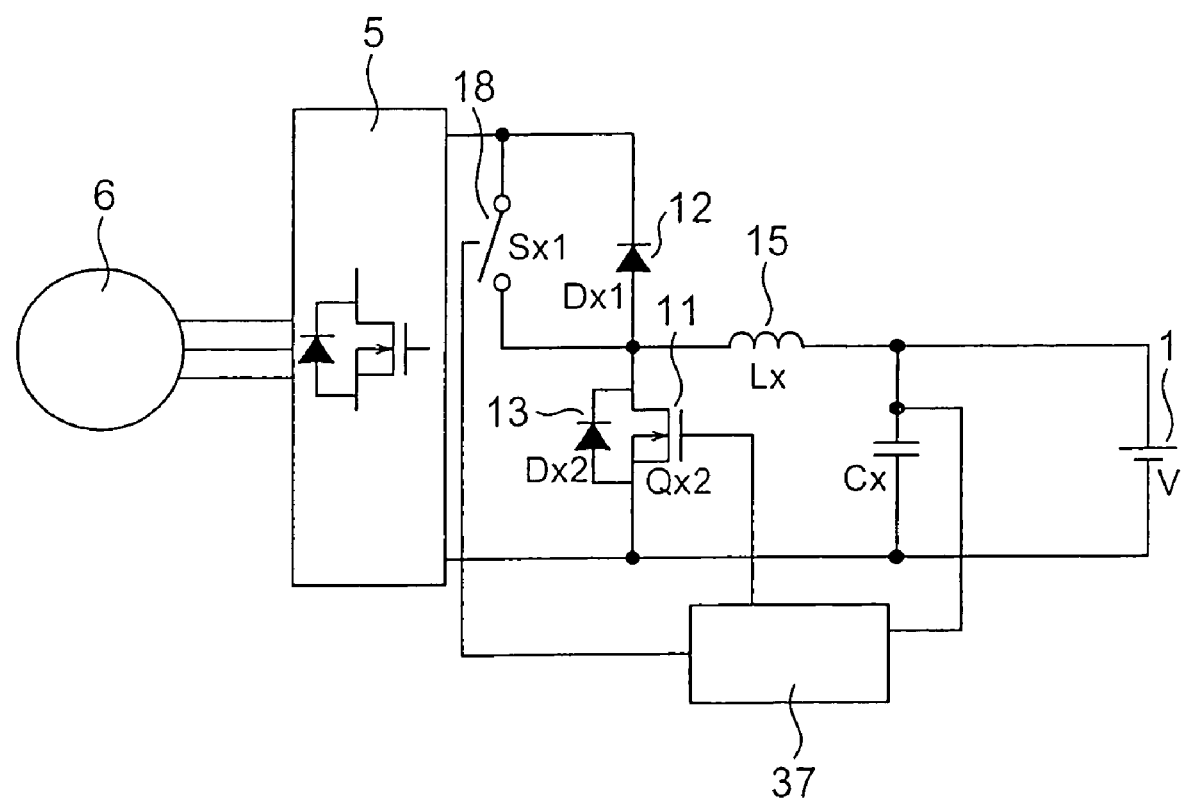
FIG. 18 is a block diagram showing a configuration of an automobile power conversion system according to Embodiment 6 of the present invention.

FIG. 18 shows a configuration of Embodiment 6 of the present invention. Embodiment 6 is different from Embodiment 3 shown in FIG. 6 in that the mechanical switch 18 (Sx1) substitutes for the switching element 10 (Qx1) of Embodiment 3 which is constituted by the MOSFET.

In this embodiment, in a power generation time period (T2), the battery 1 is charged while constantly turning on the switching element 10 (Qx1). As described above, the mechanical switch exhibits a very low resistance, thus the amount of heat generation in the DC/DC converter portion of the power unit can further be suppressed at a lower level. Thus, the power unit can be reduced in size and cost.

Figure 19:
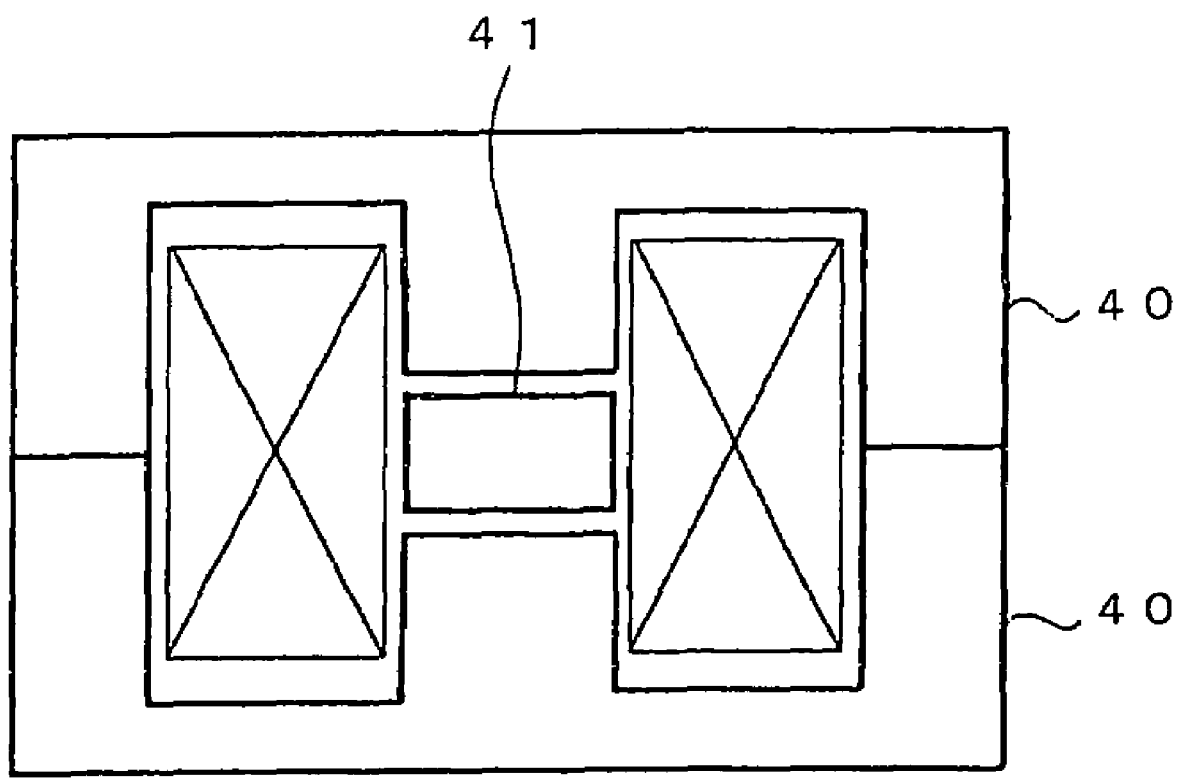
FIG. 19 is an explanatory view showing another example of a choke coil provided in the automobile power conversion systems according to Embodiments 1 to 6 of the present invention.

The choke coil Lx mentioned in Embodiments 1 to 6 has been described as a standard choke coil. However, if this choke coil Lx is designed as a magnetic field biasing type having a coil structure shown in FIG. 19, a merit is obtained in that the choke coil can be reduced in size. In the magnetic field biasing type, as shown in FIG. 19, a magnet 41 is disposed inside a core 40. When this type is adopted, a desired inductance value is achieved in a voltage-boosting direction despite the reduction in size. On the other hand, when the amount of a current increases in a reverse-current direction, an inductance value in the reverse direction cannot be obtained (magnetic saturation of the core occurs). In the case of the present invention, however, there is no trouble caused without an inductance value in a current direction from an inverter to a battery.

As just described, the choke coil Lx mentioned in Embodiments 1 to 6 may be constructed of a choke coil of a magnetic field biasing type in which a magnet is disposed inside a core. In this case, in addition to an effect similar to those of Embodiments 1 to 6, there is also an effect that the power unit can be reduced in size.

The invention claimed is:

1. An automobile power unit comprising:
   an engine;
   a motor that transmits a dynamic force to the engine and starts the engine, and that receives a dynamic force of the engine during rotation of the engine and generates a power;

a power conversion circuit that has at least two DC voltage input/output terminals and transmits a power to the motor;

a battery that is connected to the power conversion circuit;

an energy storage source that is connected in series to the battery and stores energy; and a DC/DC converter that is composed of at least two switching elements, that charges the energy storage source by boosting a voltage of the energy storage source, and that recovers energy in the energy storage source to the battery by lowering a voltage of the energy storage source, wherein the switching elements of the DC/DC converter connect a high-voltage-side of the DC voltage input/output terminal of the power conversion circuit to a high-voltage-side terminal of the battery;

wherein when the motor receives a dynamic force of the engine, generates a power, and charges the battery through the power conversion circuit and the DC/DC converter, the switching elements provided in the DC/DC converter are constantly turned on; and wherein after the engine has been started by the motor and before the power generation is carried out, the DC/DC converter operates the energy storage source in a voltage-lowerihg manner and recovers energy stored in the energy storage source to the battery.

2. The automobile power unit according to claim 1, wherein the energy storage source is charged during stop, pre-stop idling, or deceleration of the vehicle.

3. The automobile power unit according to claim 1, wherein each of the switching elements of the DC/DC converter is constituted by a semiconductor element.

4. The automobile power unit according to claim 1, wherein each of the switching elements of the DC/DC converter is constituted by a parallel circuit composed of a semiconductor element and a mechanical switch.

5. The automobile power unit according to claim 1, wherein the energy storage source is charged from the battery via the DC/DC converter before the engine is started by the motor.

6. The automobile power unit according to claim 1, wherein the switching element of the DC/DC converter is constituted by a mechanical switch.

7. An automobile power unit comprising:

an engine;

a motor that transmits a dynamic force to the engine and starts the engine, and that receives a dynamic force of the engine during rotation of the engine and generates a power;

a power conversion circuit that has at least two DC voltage input/output terminals and transmits a power to the motor;

a battery that is connected to the power conversion circuit;

an energy storage source that is connected in series to the battery and stores energy;

a DC/DC converter that comprises at least two switching elements, that changes the energy storage source by boosting a voltage of the energy storage source; and a switch connected between a high-voltage-side terminal of the energy storage source and a high-voltage-side of the DC voltage input/output terminal of the power conversion circuit, wherein the switching elements of the DC/DC converter connect the high-voltage-side of the DC voltage input/output terminal of the power conversion circuit to a high-voltage-side terminal of the battery, and wherein when the motor receives a dynamic force of the engine, generates a power, and charges the battery through the power conversion circuit and the DC/DC converter, the switching elements provided in the DC/DC converter are constantly turned on and the switch is turned off.

8. The automobile power unit according to claim 7, wherein the energy storage source is charged during stop, pre-stop idling, or deceleration of the vehicle.

9. The automobile power unit according to claim 7, wherein each of the switching elements of the DC/DC converter is constituted by a semiconductor element.

10. The automobile power unit according to claim 7, wherein each of the switching elements of the DC/DC converter is constituted by a parallel circuit composed of a semiconductor element and a mechanical switch.

11. The automobile power unit according to claim 7, wherein the energy storage source is charged from the battery via the DC/DC converter before the engine is started by the motor.

12. The automobile power unit according to claim 7,
wherein energy is supplied from the battery to the power conversion circuit in a first half of a time period in which the engine is started by the motor, and
wherein energy is supplied from the battery and the energy storage source to the power conversion circuit in a second half of the time period.

13. The automobile power unit according to claim 7, wherein the switch connected between the high-voltage-side terminal of the energy storage source and the high-voltage-side of the DC voltage input/output terminal of the power conversion circuit is constituted by a semiconductor element.

14. The automobile power unit according to claim 7, wherein the switching element of the DC/DC converter is constituted by a mechanical switch.

15. The automobile power unit according to claim 7, wherein the switch connected between the high-voltage-side terminal of the energy storage source and the high-voltage-side of the DC voltage input/output terminal of the power conversion circuit is constituted by a mechanical switch.

16. An automobile power unit according to claim 7,
wherein the DC/DC converter further comprises a diode, and
wherein the diode is disposed in parallel with the switching elements of the DC/DC converter for use when the DC/DC converter charges the energy storage source by boosting a voltage of the energy storage source.

17. The automobile power unit according to claim 7, wherein each of the switching elements of the DC/DC converter is constituted by a semiconductor element.

18. The automobile power unit according to claim 7, wherein each of the switching elements of the DC/DC converter is constituted by a mechanical switch.

19. The automobile power unit according to claim 7, wherein the switch is constituted by a semiconductor element.

20. The automobile power unit according to claim 7, wherein the switch is constituted by a mechanical switch.

* * * * *